United States Patent [19]

Rappas et al.

[11] Patent Number: 5,573,672

[45] Date of Patent: Nov. 12, 1996

[54] WATER MANAGED SOLVENT EXTRACTION PROCESS FOR THE ORGANIC WASTES

[76] Inventors: Alkis S. Rappas, 17180 PennyLane, Bainbridge, Ohio 44023; Stephen C. Paspek, 459 Quail Run, Broadview Hts., Ohio 44147; David S. Davies, 1890 Co's Post Run, Westlake, Ohio 44145

[21] Appl. No.: 411,351

[22] Filed: Mar. 21, 1995

Related U.S. Application Data

[63] Continuation of Ser. No. 67,453, May 24, 1993, abandoned.

[51] Int. Cl.$^6$ ..................................................... B01D 15/04
[52] U.S. Cl. .......................... 210/638; 210/770; 210/774; 210/903; 210/904; 210/751; 210/639; 208/314; 208/188
[58] Field of Search ..................................... 210/638, 639, 210/758, 751, 770, 774, 903, 904, 908, 771, 772; 208/187, 188, 314

[56] References Cited

U.S. PATENT DOCUMENTS

| | | |
|---|---|---|
| 3,772,191 | 11/1973 | Thorn . |
| 3,897,238 | 7/1975 | Bolsing et al. . |
| 3,997,438 | 12/1976 | Weiland et al. . |
| 4,018,679 | 4/1977 | Bolsing . |
| 4,057,486 | 11/1979 | Meadus et al. ............................ 208/11 |
| 4,226,712 | 10/1980 | Kamer .................................... 210/710 |
| 4,260,489 | 4/1981 | Greig et al. .............................. 210/771 |
| 4,270,279 | 6/1981 | Roediger . |
| 4,288,329 | 9/1981 | Duval .................................... 210/772 |
| 4,295,972 | 10/1981 | Kamer .................................... 210/710 |
| 4,350,598 | 9/1982 | Bolsing .................................. 210/751 |
| 4,488,971 | 12/1984 | Bolsing .................................. 210/751 |
| 4,842,715 | 6/1989 | Paspek, Jr. et al. ....................... 208/13 |
| 4,981,579 | 1/1991 | Paspek et al. ........................... 208/314 |
| 5,013,458 | 5/1991 | Christy, Sr. et al. ..................... 210/751 |
| 5,269,906 | 12/1993 | Reynolds et al. ........................ 210/770 |
| 5,271,851 | 12/1993 | Nelson et al. .......................... 210/770 |
| 5,279,747 | 1/1994 | Chu ..................................... 210/770 |
| 5,284,991 | 2/1994 | Chu ..................................... 210/770 |
| 5,288,413 | 2/1994 | Chu ..................................... 210/770 |

OTHER PUBLICATIONS

"Development of a Solvent Extraction Method for Determining Semivolatile Organic Compounds in Solid Wastes", Hazardous and Industrial Solid Waste Testing: Second Symposium, ASTM STP 805, R. A. Conway et al. American Society for Testing and Materials, 1983, pp. 203–213.

Holcombe et al, The Carver–Greenfield Process® for the Treatment of Oily Refinery Sludges, Dec. 12, 1991.

Poche et. al., "Solvent Extraction of Refinery Wastes Rates", Oil & Gas Journal pp. 73–77, vol. 89, No. 1, Jan. 7, 1991.

Primary Examiner—Ana Fortuna
Attorney, Agent, or Firm—David J. Untener; Brian L. Mehosky; Michael F. Esposito

[57] ABSTRACT

The invention relates to a process for separating extractable organic material from a composition comprising organic material intermixed with solids and water. The composition is contacted with a solvent and a dehydrating agent. The dehydrating agent removes water, improves the solvent extraction, and aids in later separation of the solids from the solvent. The process additionally provides a means for removing cyanide compounds from the composition and fixating the metals against leaching.

22 Claims, 1 Drawing Sheet

1

WATER MANAGED SOLVENT EXTRACTION PROCESS FOR THE ORGANIC WASTES

This is a continuation of application Ser. No. 08/067,453 filed on May 24, 1993, now abandoned.

FIELD OF THE INVENTION

The invention relates to a process for separating extractable organic material from a composition comprising organic material intermixed with solids and water. The invention is particularly suitable for separating undesirable and/or recoverable organic material from solid waste and hazardous waste.

BACKGROUND OF THE INVENTION

Industry produces solid containing wastes, such as refinery sludge, solids-stabilized emulsions, contaminated soils and the like that require disposal. Some of these wastes are listed as hazardous wastes by the Environmental Protection Agency (EPA) and are regulated under legislation such as the Resource, Conservation, and Recovery Act (RCRA). The term hazardous waste is defined by relevant government rules and regulations, in particular RCRA, and further refers to organic and/or inorganic material or combinations of organic materials which are "listed" by the Environmental Protection Agency as hazardous, or which exhibit ignitability, corrosively or reactivity. The term solid waste refers to any garbage, sludge or other waste material. In the past, solid wastes such as refinery sludge have been disposed of by land fills and land farms. To comply with current regulations, the constituents of the solid waste must be treated to separate some of the organic materials, to destroy cyanides and to fixate metals.

It is desirable to extract the organics, destroy the cyanide, fixate the metals and remove the water from the solids prior to disposal in approved land fills. Further, it is desirable to recycle valuable components of the solid waste prior to disposal. Alternatives to conventional land fills are being examined in view of environmental concerns and considerations.

Various technologies for treating wastes to render the solids acceptable for land disposal are being developed and have been examined, but none has been found entirely satisfactory. Solvent extraction processes for treating wastes are mostly in the developmental stage. Limitations to solvent extraction technologies are consistency of treatment performance, toxicity of spent solvents and a non-integrated system for waste treatment. Other methods to process wastes include incineration and vitrification. Incineration is energy intensive, and not a publicly acceptable method of disposal. Vitrification is a thermal treatment process that converts contaminated soil into a chemically inert and stable product by means of high heat, and is also highly energy intensive.

We have discovered a water-managed solvent extraction process that treats solid waste efficiently, economically and reliably resulting in products acceptable for land disposal. We have found a process that deliberately controls the water throughout the process by capturing the water at the beginning of the process and releasing it at the end as recovered water. The organic removal from the waste is more thorough, reliable and predictable by managing the water in the process. It will become evident that the process of the instant invention is an integrated system that treats solid organic waste by extraction of the organics, destruction of the cyanides and fixation of metals while focusing on a directed distribution, transfer and mass balance of water throughout the overall process. Further, it will be seen that the process of the instant invention can produce recyclable and/or sellable end products, thus contributing to the overall environmental and societal concerns of the 1990's and beyond.

It is the object of the instant invention to provide a water-managed solvent extraction process that treats solid wastes.

It is another object of the instant invention to provide a solvent extraction process that controls water distribution during solid waste treatment.

It is another object of the instant invention to provide a method for the dehydration of waste and the solubilization of organic materials, fixation of metals, and destruction of cyanide to produce a treated product that is acceptable for land disposal.

These and other objects together with the advantages over known methods shall become apparent from the specification which follows and are accomplished by the invention herein described and claimed.

SUMMARY OF THE INVENTION

We have discovered a method of solvent extraction of waste wherein the amount of water in the feed is controlled through the use of a dehydration additive during solvent extraction.

The invention is a process for separating extractable organic material from a feed composition comprising said extractable organic material intermixed with solids and water, the process comprising the steps of:

(a) contacting said feed composition with a first organic solvent to extract at least a portion of said extractable organic material, and with a dehydration additive which combines with the water in said feed composition through chemical or sorbent means to form a hydrated additive; and (b) separating at least part of the first organic solvent containing extractable organic material from said solids and hydrated additive.

In another embodiment of the invention, the solids are further treated by calcination and/or chemical fixation to destroy cyanide and/or immobilize metals.

The process of this invention is useful in treating organic containing waste streams and/or hazardous waste to provide solids that can be land disposed, salable end products or recycled components.

DESCRIPTION OF THE FIGURE

Figure 1:
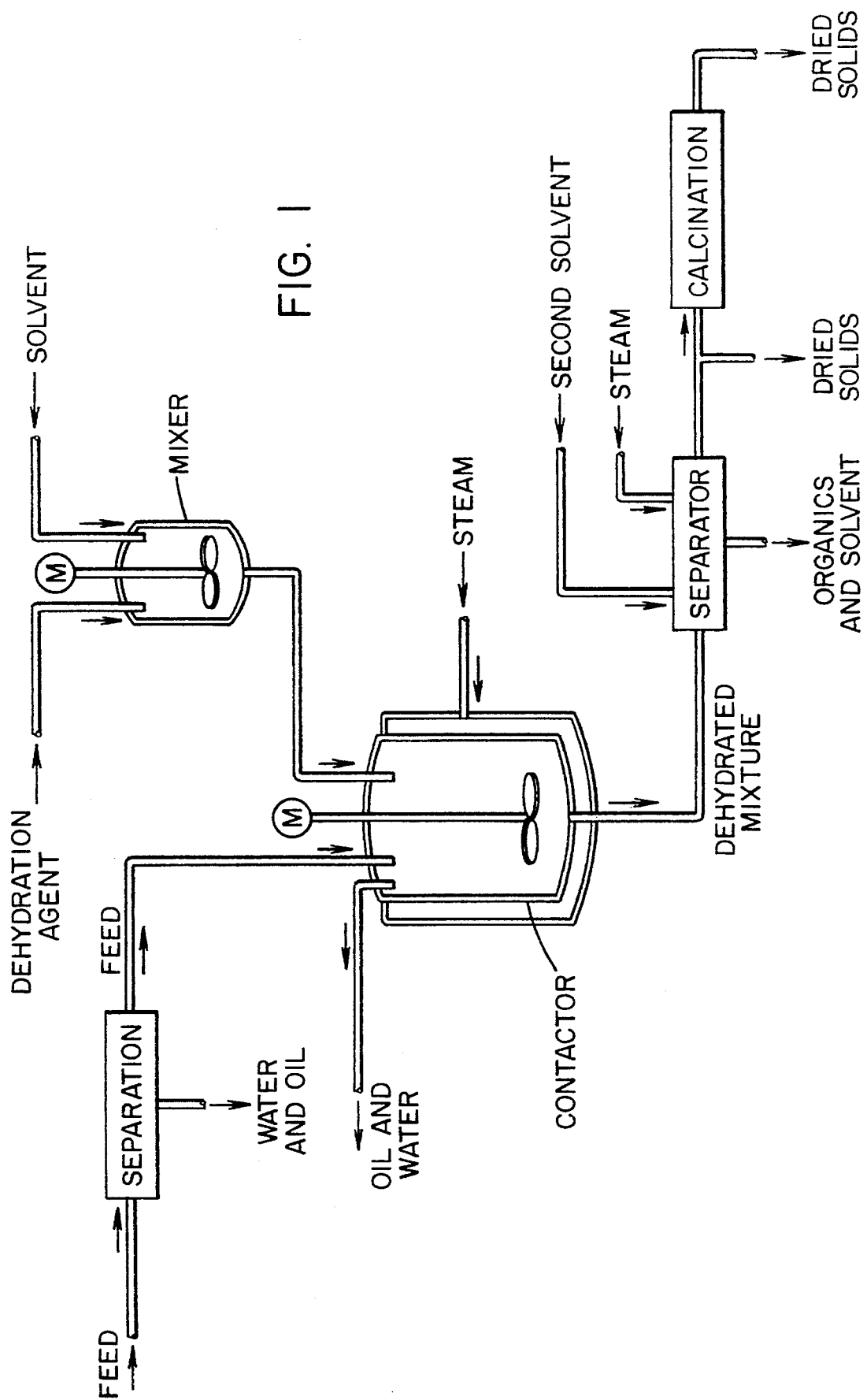
FIG. 1 is flow sheet illustrating embodiments of the present invention.

FIG. 1 is a flow sheet illustrating several embodiments of the inventive process. The feed to the process, comprising extractable organic material intermixed with solids and water may first be passed to a separation step, described in further detail below, to remove a portion of the oil and water. Although not required, this step allows use of less dehydrating agent later in the process. The partially de-oiled and de-watered solids are then introduced into a contactor vessel. The dehydration agent and solvent are introduced into the contactor vessel. As shown in the Figure, an embodiment of the process comprises mixing the dehydration additive and the solvent prior to its introduction into the contactor. The contactor is in a vessel that will provide mixing of these streams. Agitation is optional, but preferable, and can be used on a continuous or an intermittent basis. The contactor may additionally be a steam jacketed vessel wherein steam provides heat to the slurry mixture over and above that provided by the exothermic reaction of the dehydration agent. In such an embodiment, a vaporous stream may be removed from the contactor comprising oil and water. The resultant dehydration mixture is then passed to a separator to separate the organic material and solvent from the hydrated additive and solids. This separation may be accomplished by filtration, centrifugation, settlers and the like. After separation of the organics and solvent, a second solvent extraction may be performed on the solids if desired to further treat the solids. This secondary solvent extraction will generally remove any trapped initial solvent and any organic material not separated in the primary extraction. Steam may optionally be used to remove any remaining secondary solvent. In addition, steam stripping of the solids can be used to destroy residual cyanides. The dried solids from the separator step can then be disposed of or passed to a calcination step to destroy any remaining cyanides and to fixate a portion of the metals that are contained in the solids.

DETAILED DESCRIPTION OF THE INVENTION

The subject of the invention is a process for partitioning extractable organic material, destroying cyanide and/or fixating metals from a waste stream.

A wide variation of wastes can be treated by the instant invention. The feeds that can be treated by the invention include organic containing waste streams and/or hazardous waste. The feed includes but is not limited to petroleum waste, refinery waste, production sludge, raw sludge, oily sludge, API separator bottoms, dissolved air floatation float, slop oil, filter cake, belt press cake, desalter cuff, solid-stabilized emulsions, froths and the like.

The feed composition may vary widely, and can comprise:
(i) up to about 98% by weight water;
(ii) up to about 90% by weight inorganic solids;
(iii) up to about 98% by weight organic solids;
(iv) up to about 98% by weight organic liquids;
(v) up to about 90% by weight metals and/or metal compounds; and
(vi) up to about 98% by weight four- and/or five-ring polynuclear aromatic compounds.

A typical refinery waste feed suitable for this process contains from about 1% to about 25% by weight hydrocarbon oil, from about 45% to about 80% by weight water and from about 1% to about 60% by weight solids.

The feed includes free water. The term "free water" is used herein to refer to water that is not chemically bound or is not trapped within the voids of the solids in the feed or does not adhere to the surface of the solids in the feed.

In one embodiment, a portion of the free water in the feed may first be separated from the feed by using conventional separation techniques such as filtration, centrifugation, settling, belt pressing and the like. The role of this step is to remove water to reduce the amount of dehydration additive needed.

The feed is dehydrated in the presence of a suitable solvent. The feed is mixed with a suitable solvent herein called the feed slurry and then dehydrated. The solvent may also be mixed with the dehydration agent prior to mixing with the feed. By performing the dehydration in the presence of solvent, the heat transfer and mass transfer of the system is greatly improved over direct thermal processes.

The dehydration step occurs by adding a dehydration additive to the feed slurry. The additive may be one that operates by chemical means, such as calcium oxide and water giving calcium hydroxide, or by sorption means. The dehydration additive is added as a dry solid or as a slurry in an organic solvent to the feed slurry. Pre treatment of the dehydration additive with a surfactant/surface active agent is not necessary, nor desirable for the process of the instant invention. The preferred feed slurry density in the dehydration step is about 1% to about 50% by weight solids, preferably about 5% to about 30% by weight solids and most preferable about 10% to about 20% by weight solids.

The chemical dehydration additives include, but are not limited to alkaline earth metal oxides such as calcium oxide (also known as lime, quicklime or unslaked lime); barium oxide and magnesium oxide; alkaline sulfates; aluminum oxides; alkali earth metal sulfates; alkali chlorides; alkali earth metal chlorides; calcined dolomite; pozzalime; and cement. Sorbents include, but are not limited to clay, perlite, corn cobs, saw dust, excelsin; and any salt that exists in both an anhydrous and a hydrated state and the like. The preferred chemical dehydration additives are alkaline earth metal oxides, alkaline sulfates, alkali earth metal sulfates, alkali chloride alkali earth metal chlorides, pozzalime, cement, calcined dolomite and the like. The most preferred chemical dehydration additive is calcium oxide. The dehydration additives can be employed either alone or in combination. The dehydration additives do not have to be pure and may contain impurities so long as the impurities do not interfere with the additive's functions.

Chemical/sorption and thermal dehydration occurs by the addition of the dehydration additive and raising the temperature of the reactor by an external heat source and/or in situ heat generation. Thermal dehydration occurs when the temperature in the reactor rises above about 80° C. and the water and organics reach a temperature where the water begins to boil off. In one embodiment, the water may boil off with the organics as an azeotrope at a temperature below 100° C. In situ heat is generated by the exothermic chemical dehydration reaction producing heat. External heat can be added to the reactor to raise the operating temperature. The temperature is raised to sufficiently remove the free water. Generally, the temperature is raised above 80° C. at 1 atmosphere. The process can be operated at different temperatures and pressures as determined by a person skilled in the art.

The preferred method of contacting the feed, additive and solvent is in a jacketed conventional stirred tank reactor. This operation can be either continuous or batch. Additional heat is provided to the reactor to raise the temperature to the preferred range of 125° C. to 160° C. with 150° C. being most preferred when using calcium oxide. The reactor may also be operated with continuous or incremental feed or withdrawal. The required residence time is on the order of 15 minutes but will vary due to the additive used and the amount of hydrolytic destruction of cyanide desired.

The temperature rise during the chemical dehydration step may be monitored to determine that the hydration reaction between the dehydration additive and the free water is taking place to its completion. The hydration reaction is highly exothermic. For example, if calcium oxide is the dehydration additive, then about 491 BTU's per pound of calcium oxide hydrating to calcium hydroxide $(CaO+H_2O)\rightarrow Ca(OH)_2$ is generated.

The dehydrated slurry is characterized as being substantially anhydrous which refers to the removal of substantially all the free water from the feed. The dehydrated slurry typically contains free water in the range of about 0.1% to about 1% free water. The main role of dehydration is to remove free water from the feed to enable better dispersion of the feed in the extracting solvent to improve solid/solvent contact, resulting in superior mass transfer of organics from the waste into the solvent. Removal of substantially all the free water enables more facile separations of the solids from the organic solvent in using processes such as filtration, centrifugation, sedimentation and the like.

The dehydrated slurry is extracted with at least one organic solvent. The primary extraction occurs at substantially the same time as dehydration occurs. The solvents for the primary extraction include but are not limited to aliphatic compounds, aromatic compounds, cycloaliphatic compounds, aliphatic-substituted aromatic compounds, cycloaliphatic-substituted aromatic compounds, aliphatic-substituted cycloaliphatic compounds and mixtures thereof. These compounds include substantially hydrocarbon compounds as well as purely hydrocarbon compounds. The term "substantially hydrocarbon" is used herein to mean that the compounds contain no non-hydrocarbon substitutes or non-carbon atoms that significantly affect the hydrocarbon characteristics or properties of such compounds relevant to their use herein as solvents. The aromatic compounds can be mononuclear (e.g., benzene) or polynuclear (e.g., naphthalene, anthracene, etc.). The aliphatic substituents on the aromatic compounds can be straight or branched chain hydrocarbon groups of 1 to about 5 carbons, cyclic groups of about 3 to about 5 carbons, or mixtures thereof. The aromatic compounds can be mono-substituted or poly-substituted. The poly-substituted aromatic compounds are preferably di-substituted. Examples include toluene, the xylenes, ethyl benzene, cyclohexyl benzene, etc. The cycloaliphatic compounds can have from about 3 to about 5 ring carbon atoms, preferably 5 or 6 ring carbon atoms, and can be saturated or unsaturated. Examples include cyclopropane, cyclobutane, cyclopentane, cyclopentene, 13-cyclopentadiene, cyclohexane, cyclohexene, 1,3-cyclohexadiene, etc. The aliphatic substituents on the aliphatic-substituted cycloaliphatic compounds can be straight chain hydrocarbon groups of 1 to about 5 carbon atoms, preferably 1 to about 3 carbon atoms. The rings of the cycloaliphatic compounds can be mono-substituted or poly-substituted. The poly-substituted compounds are preferably di-substituted. Examples include methylcyclopentane, methylcyclohexane, 1,3-dimethylcyclohexane, 3-ethylcyclopentene, 3,5-dimethylcyclopentene, etc. Ethers such as methyl tertiary butyl ether are useful.

Additionally, the solvent can be aromatic or aromatic-rich fluid that is readily available from a refinery system such as, for example, one or more reformates (e.g., light reformate, heavy reformate, etc.) that are produced by reformers in a typical refinery system. Preferred volatile organic solvents include aliphatic, aromatic and cycloaliphatic hydrocarbons having from 2 to about 9 carbon atoms, preferably from 3 to about 7 carbon atomics; halohydrocarbons of from 1 to about 9 carbon atoms, preferably 1 to about 5 carbon atoms, more preferably 1 to about 3 carbon atoms; and mixtures of two or more of any of the foregoing. Examples of such solvents include propane, cyclopropane, propylene, n-butane, isobutane, cyclobutane, butene (e.g., butene-1, cis-butene-2, trans-butene-2), butadiene (e.g., 1,3-butadiene), isobutylene, n-pentane, isopentane, neopentane, cyclopentane, pentene (e.g., pentene-1, cis-pentene-2, etc.), cyclopentene, pentadiene (e.g., 1,3-pentadiene, etc.), cyclopentadience, cyclohexane, cyclohexene, cyclohexadience, methylene chloride, dichlorodifluoromethane, trichlorofuloromethane, cloroethane, trichloroethane, dichlorotetrafluoroethane, trichlorothylene, tetrafluoroethylene, chloropropane, chlorobutane, chloropentane, dichloropentane, and mixtures of two or more thereof. Also useful are aromatic compounds such as benzene, toluene and the xylenes. This solvent can be a mixture made up primarily of hydrocarbon compounds or substantially hydrocarbon compounds of from about 5 to about 7 carbon atoms (e.g., gas well condensates comprising hydrocarbons of from about 5 to about 7 carbon atoms). Further, the solvent can be from refinery streams such as naptha, kerosene, gas oil, gasoline reformate, rafinate and the like. Mixtures of two or more of the foregoing solvents can be used.

The preferred solvent is kerosene.

The dehydrated slurry is contacted with a solvent one or more times to solubilize most of the organic material. The solvent extraction step takes place at or above ambient temperatures and pressures in the range from about 1 atmosphere to about 50 atmospheres. The solvent extraction step produces a slurry comprised of a solid rich phase containing treated solids, trapped solvent and some organics and a liquid phase containing the majority of organic material and solvent.

A solid-liquid separation is performed to partition the treated solids from the liquid containing organics and solvent. Separation of the solids from the organic liquid phase can be performed using conventional techniques including but not limited to filtration, centrifugation, settlers, mixers, hydroclones and the like. The treated solids can be further stripped with light hydrocarbons, steam, inert gas and the like. The treated solids are dried.

One advantage of this invention is that the removal of free water by dehydration generally increases the wettability of hydrophilic solids by the solvent. The increased solvent wettability of the solids increases the solubilization of the organic material into the solvent.

In another embodiment of the instant invention a secondary extraction is employed after the primary extraction step. The secondary extraction removes the trapped solvent from the treated solids and also removes organic material not separated in the primary extraction. The treated solids are washed with a secondary solvent which displaces much of the primary extraction solvent. The secondary solvent generally has the same or lower molecular weight and higher volatility than the primary solvent. The secondary solvent includes but is not limited to the primary extraction solvents and liquefied petroleum gas (LGP). Examples of LPG include commercial propane, commercial butane, commercial propane-butane mixtures, special duty propane and propane HD-5. The secondary extraction occurs at a temperature greater than or equal to ambient temperature at 1 atmosphere.

The extraction results in the separation of solvent from the treated solids, herein called the intermediate solid. The intermediate solid contains about 1 weight percent to about 35 weight percent liquid. The liquid can be removed from the intermediate solid typically by methods including but not limited to evaporation, thermal drying, vacuuming, steam stripping, striping with super heated vapor, and the like. In one embodiment, intermediate solids can be dried at a low temperature in the range of about 110° C. to about 160° C., hereinafter called dried solid.

A useful method for the secondary extraction, evaporation and drying is by employing a multiple leaf filter such as a Funda type filter or a single plate Nutch pressure filter.

In another embodiment, the dried solid may be pelletized for sale to cement manufacturers. Binders may be added to the dried solid for pelletization. The binders include but are not limited to sodium silicate, bentonite, pozzalime, cement, starch and the like.

In another embodiment, the intermediate solid or dried solid may be further processed to destroy cyanides by steam stripping, calcination and the like. Steam stripping is used to destroy residual cyanide and is achieved by passing superheated steam at about 150° C. to about 400° C. for about 1 minute to about 5 hours over the intermediate solid or dried solid. In another embodiment, decomposition of complex cyanides to mostly calcium carbonate occur in a calcination step.

Calcination will have different operating modes or conditions depending on the choices regarding the final disposition of the treated material, site specific process fit, and the original feed composition, such as the amount of cyanide, metals and sulfur in the feed. When using calcium oxide as the dehydration additive, the calcination can be operated at 345° C. or below in which case the hydrated additive will not release the bound water, or at temperatures above 345° C. where the additive will release the bound water. At temperatures above 500° C., calcium carbonate (formed by the oxidation of cyanide in the feed) will start to convert back to calcium oxide. Other chemical dehydration additives will employ different temperatures known to a person skilled in the art.

An advantage of calcining is that it also fixates a portion of the metals in the intermediate solid or dried solid which immobilizes the metal so it cannot leach out.

In another embodiment, if additional metal fixation is desired metal fixating agents may be added to the intermediate solid, dried solid or calcined dry material, Metal fixation agents include but are not limited to pozzalime, cement, fly ash, sodium silicates and the like and as known in the art. The metal fixation agents can be added to the intermediate solid, dried solid or calcined dry material in a water slurry. A typical fixation recipe is about 1% to about 75% by weight metal fixation agent to the intermediate solid, dried solid or calcined dry material. A slurry of metal fixation agents may be added and mixed with the intermediate solid, dried solid or calcined dry material. The liquid is then separated and the resulting material dried. This step encapsulates the metal in the resulting dry product. The resulting dry product is a clean solid which generally meets BDAT (Best Demonstrated Available Technology) requirements as required by RCRA for land disposal.

The advantages of the instant invention are many. The water-managed solvent extraction process for wastes is non-destructive technology and many of the resources are recovered. There is substantial flexibility in the process of the instant invention so that organic material is separated from waste, metals are immobilized and cyanide destroyed.

Another advantage of the invention is the destruction of residual cyanides by the substantial conversion to harmless calcium carbonates. This starts to occur during the initial contacting of the chemical additive with the feed, and during the calcination step.

The invention is advantageous in that it facilitates metal fixation by enabling the incorporation of hazardous metals in a structure with high stability to leaching. Further, the generated product has high stability against auto ignition. It is believed that the main reason for this higher stability is due to the new solid phase created during the dehydration step. The new solid phase may provide enough separation between the unreacted sulfide particles and be a heat sink to prevent the solid from reaching self-ignition.

The process of the instant invention also provides a means of reclaiming substantially clean water from a previously highly contaminated waste stream. Most of the organics and solvents are removed prior to calcination where the water is released, and this water is suitable for recycling.

The instant invention provides for treating wastes and rendering many of the waste components recyclable and solids acceptable for land disposal.

SPECIFIC EMBODIMENTS

The following examples demonstrate the process and advantages of the present invention:

Although the invention has been described in detail through the preceding examples, these examples are for the purpose of illustration only, and it is understood that variations and modifications can be made by one skilled in the art without departing from the spirit and the scope of the invention as hereinafter claimed.

EXAMPLE 1

An oily refinery sludge was belt pressed to form a cake consisting of approximately 27 weight percent solids, 22 weight percent oil and 51 weight percent water.

One weight of the belt press cake was mixed with about 1 weight of lime (CaO), and 2 weights of heavy reformate. The slurry was heated to about 125° C.

The initial solid-liquid separation was done in a Buchner funnel with a Watman #4 filter paper and house vacuum. The hot slurry was poured into the filter and allowed to drain. A cake of more than 3 inches in depth was formed. Filtration was very rapid, and the cake was essentially incompressible. The cake was uniform, with no evidence of segregation. There was no evidence of sliming.

The filter cake was re-slurried in additional heavy reformate and re-filtered in the same apparatus. A total of 4 reformate washes were used, for a total of eight weights of solvent/weight of sludge. The light color of the wash liquors indicates that re-slurring was probably not necessary, and that the cake could have been washed "in place" on the filter.

The filter cake was cooled to about 25° C., and washed with one aliquot of pentane to remove the residual reformate. residual pentane was removed by heating the filter cake to about 50° C. in a nitrogen-purged oven.

Soxhelet analysis of the solids using toluene as the solvent indicated 0.16 wt % residual oil.

A portion of the oil-free filter cake from this 0 experiment was steam-stripped at 250° C. The cyanide level was reduced from about 69 ppm to 0.19 ppm. PNA analysis of the solvent extracted and the steam-stripped solids showed no detectable PNA's.

In summary, the data indicated that the addition of lime to the belt press cake resulted in an easily extracted, non-compressible solid cake. Residual oil and PNA's are removed and cyanides can be removed through steam stripping.

Comparative Example A

In a comparative test, one weight of belt press cake was mixed with two weights of heavy reformate and heated to 90° C. Attempts to vacuum filter the mixture through a Watman #4 paper were unsuccessful due to "sliming" and plugging of the filter.

Comparative Example B

The belt press cake of Example 1 was first dried. A slurry was then made by mixing: dried belt press cake (100 grams), and CaO (25 grams) in that order. The slurry was warmed to about 150° F., and then filtered using a vacuum filter.

Filtration was poor, requiring about 30 minutes to form a filter cake. The filter cake was uneven, and "slimed" the filter paper.

The filtration time was sufficiently long to allow solids segregation. Examination of the cake showed coarse solids in the bottom layer, and fine "greasy" solids in the top layer. The top layer constituted roughly 25 vol % of the total filter cake. These fines contribute to filter blinding and long filtration times. In addition, it impeded the uniform solvent washing of the filter cake to remove and recover residual oils. The cake was washed with 3 weights of pentane and dried. Residual oil levels were greater than 2 wt % indicating poor extractability.

Comparative Example C

A small amount of water (i.e. about 10 ml) was then added to the slurry in an effort to hydrate the lime and to improve the cake physical properties. The slurry took on a milky appearance, indicating that the lime was being hydrated. However, the intimate contact between the cake solids and the hydrated lime was not observed. Rather, the hydrated lime remained suspended in the water phase, causing it to appear milky. When a few ml's of the slurry were placed on a paper towel, water wicked out, indicating that the water phase was external in the emulsion. Filtration of this "hydrated" slurry was very poor-worse than the filtration of the slurry without the addition of water. After 2 hours, the filtration was still incomplete. It was impossible to pentane wash and/or to determine the level of residual oil.

EXAMPLE 2

A slurry similar to the slurry of comparative examples B and C was prepared, but used re-hydrated belt press cake. The belt press cake was re-hydrated by mixing 100 grams of cake with 10 grams of water and stirring well. The slurry was made by mixing rehydrated cake (110 grams) with kerosene (100 grams) and CaO (25 grams) in that order. The amount of water used in the re-hydration step was about 125% of the stoichiometric amount of water required to hydrate the CaO. A smooth, homogeneous slurry resulted. When a few ml's were placed on a paper towel, black oil wicked out, indicating that oil was the external phase. The slurry was heated to about 150° F., and filtered through a vacuum filter apparatus. Filtration was rapid, with no evidence of segregation or "sliming" of the filter paper. The cake was washed with 3 weights of pentane and dried. Residual oil level was measured at 0.12 wt %, This indicates excellent extractability of this material.

This indicates that it is important to have sufficient moisture in the sludge solids to hydrate the lime. This moisture must be present (or added) prior to the addition of solvent (kerosene) and lime. Pre-drying the sludge (i.e. 100% water removal) is contra-indicated.

CALCIUM HYDROXIDE EXPERIMENTS

The slurries of comparative example B and example 2 were repeated using calcium hydroxide in place of CaO.

The slurry of comparative example B was prepared again using dried belt press sludge (100 grams), kerosene (100 grams), and a molar equivalent amount of calcium hydroxide (i.e. 33 grams of hydrated lime). Results were identical to those obtained with calcium oxide—poor slurry uniformity, and poor filtration. This indicates that the hydration of the lime should occur in intimate contact with the sludge solids to achieve the desired results. The cake was washed with 3 weights of pentane and dried. Residual oil levels were greater than 2 wt % indicating poor extractability.

The slurry of example 2 was prepared again using rehydrated belt press sludge (100 grams sludge+10 grams water), kerosene (100 grams), and a molar equivalent amount of calcium hydroxide (i.e. 33 grams of hydrated lime). Results were far inferior to those obtained with calcium oxide. The slurry was not uniform, and filtration was poor. After 3 hours, the filtration was still incomplete. It was not possible to pentane wash the cake, or to determine residual oil levels.

EXAMPLES 3–5

Deliquefied oily refinery sludge (belt press cake, and one plate and frame pressure filter cake) was used as feed. The solids-oil-water (SOW) composition in wt % of these feeds are given in table I. The chemical (quicklime)/thermal dehydration extraction step was conducted in all cases in a 50 gal externally heated jacketed stir tank reactor. The reactor was equipped with a water cooled overhead condenser to collect light oil fractions and any water removed by thermal means from the slurry in the reactor. A low flow nitrogen sweep was used to facilitate the water vapor removal from the reactor in those cases that substoichiometric amount of lime (relative to the contained water in the feed) was used, with the balance water being thermally removed (evaporation).

The solvent used for the dehydration-extraction step was water white kerosene. This solvent was preheated to about 110°–120° C. in an adjacent jacketed reactor. The dehydration-extraction operation in these experiments was conducted as a batch process. The weighed amount of filter cake feed was loaded into the reactor at ambient temperature. The calculated amount of lime was then added to the sludge. A sufficient amount of kerosene is then introduced into the dehydration reactor as stirring is commenced. The stirring speed is not critical, and could be between 50 and 200 rpm. The amount of kerosene added is sufficient to give an initial slurry density of about 30 wt % solids. Additional solvent was added to achieve an end slurry density of 10–30 wt % solids while the exothermic reaction was well in progress.

The sludge solids reported are inorganic (plus coke, if any) solids. The residence time in these tests was a minimum of one hour.

Portions of the dehydrated/extracted slurry from the extraction tank were then pumped to a multiple leaf pressure filter, a Funda filter by Steri-Technologies, Inc. The filtering area of the filter was about 0.05 square meters, with 50 micron screen. The filter had a jacket for steam heating. Filtration of the slurry was thus done hot, at about 20° C. lower temperature than that in the dehydration/extraction tank. The filter cake thickness was about 2 centimeters (¾ inches).

At the end of the filtration cycle, the filter cake in the filter unit was subjected to an inplace further extraction/washing by passing fresh solvent through the cake and collecting the new wash/filtrate, which is cleaner than the initial filtrate.

Enough solvent was passed through the cake, typically 6–10 times the weight of the wet cake in the filter, to yield an almost clear extract. The solvent used first to finish off the extraction was kerosene. The extraction was mostly achieved, but not completed (depending on the PNA type and content, and the type of solids in the process feed) in the dehydration/extraction tank. Completion of the extraction/washing process was achieved in the filter. This cycle in the filter was done with quantities of hot and/or cold kerosene.

At the end of the Kerosene extraction/wash cycle, in examples 3, 3A and 5, the wet filter cake was further washed in place with second solvent, light naphtha. Typically 4–6 displacement volumes of this solvent are sufficient. When naphtha was used, it was after a cold kerosene second wash. The purpose of this was to displace the kerosene from the filter cake with the more volatile new solvent. This procedure allowed the inplace thorough drying of the filter cake at much lower temperature, i.e. at about 110° C. Drying was done by passing nitrogen through the cake in the filter while externally (through the jacket using steam to heat the filter. The drying time was about 12–16 hours.

At the end of the drying cycle, the dry clean extracted solids on the horizontal plates of the filter were discharged centrifugally by spinning the plate assembly. The calcinations were done in a bench scale 2 and ½ inch diameter gas tight rotary kiln. Very low flow rates of gas (e.g. 50 cc per minute) were passed through the kiln. The gases used were nitrogen or air. The residence time in the kiln was on the order of 1–1.5 hours.

TABLE I

| | SLUDGE COMPOSITION | | |
|---|---|---|---|
| Example | wt % Solids | wt % Oil | wt % Water |
| 3 | 27.7 | 30.3 | 42 |
| 4 | 26.5 | 21.9 | 51.6 |
| 5 | 40.5 | 8.9 | 50.6 |

EXAMPLE 3

0.7 lbs. of Lime was added as described above to the sludge containing 2.77 lbs. of solids. This amounts to a 25 wt % Lime on solids. Sufficient kerosene was added to obtain a 10 wt % solids slurry. After sufficient residence time, the slurry was passed to the filter and washed with hot kerosene, cold kerosene and light naphtha. The filter cake was then dried at 110° C.

EXAMPLE 3A

Example 3 was repeated, with the filter cake dried at 260° C.

EXAMPLE 4

5.3 lbs. of Lime was added to the sludge containing 10.6 lbs. of solids (50 wt % Lime on solids). Sufficient kerosene was added to obtain a 30 wt % slurry. The slurry was passed to the filter and washed with hot kerosene. The filter cake was then dried at 110° C.

EXAMPLE 5

10.5 lbs. of Lime was added to the sludge containing 4.24 lbs. of solids (250 wt % Lime on solids). Sufficient kerosene was added to obtain a 10 wt % slurry. The slurry was passed to the filter and washed with hot kerosene, cold kerosene and light naphtha. The filter cake was then dried at 110° C.

TABLE II

| | Filter Product Composition | | |
|---|---|---|---|
| Example | wt % Solids | wt % Oil | wt % Water |
| 3 | 98.33 | 1.09 | 0.58 |
| 3A | 100. | 0.0 | 0.0 |
| 4 | 99.43 | 0.0 | 0.0 |
| 5 | 99.8 | 0.2 | 0.0 |

The filter cakes of Examples 3, 4 and 5 were analyzed for their leachable metals.

TABLE III

| | FILTER PRODUCT METALS | | | |
|---|---|---|---|---|
| Example | ppb Chromium | ppb Nickel | ppb Arsenic | ppm Cyanide |
| 3 | 27 | 100 | 7.2 | <1 |
| 4 | 105 | 371 | 61 | 12.4 |
| 5 | 99 | 151 | 22 | 1.11 |

The filter cakes were then calcined in a rotary kiln. Example 3 was calcined with humid nitrogen at 275° C. Examples 4 and 5 were calcined with humid air at 275° C. The results, along with the BDAT Levels, are shown in TABLE IV.

TABLE IV

| | CALCINED PRODUCT METALS | | | |
|---|---|---|---|---|
| Example | ppb Chromium | ppb Nickel | ppb Arsenic | ppm Cyanide |
| BDAT | 1700 | 200 | — | 1.8 |
| 3 | <25 | 104 | 6.8 | <1 |
| 4 | 110 | 56 | 21 | 0.93 |
| 5 | 470 | 34 | 8 | 1.01 |

As can be seen from the above embodiments, the use of a dehydration additive such as calcium oxide achieves multiple benefits. It reacts with water in the feed to generate a new solid. Dehydration of the sludge enables wetting of the existing solid particle surfaces with organic solvents, which significantly improves the mass transfer processes of solvent extraction. The reaction of calcium oxide with water is exothermic, and thus heat is generated for the process extraction step. The solid generated by the calcium oxide provides body to the filter cake, improving the filtering and later solvent wash. Finally, the use of calcium oxide imparts a highly alkaline environment to the slurry feed. This helps precipitate metal ions as metal hydroxides or oxides, and will initiate the decomposition of some contained cyanides.

What we claim is:

1. A process for separating extractable organic material from a feed composition comprising said extractable organic material intermixed with solids and water, the process comprising the steps of:

(a) contacting said feed composition with a first organic solvent to extract at least a portion of said extractable organic material, and with a dehydration additive selected from the group consisting of alkaline earth metal oxides, aluminum oxides, calcined dolomite, pozzalime, and combinations thereof, which operates by chemical means to combine with water in said feed composition to dehydrate said feed composition and form a hydrated additive; and (b) separating at least part of the first organic solvent containing extractable organic material from said solids and hydrated additive.

2. The process of claim 1 wherein said first organic solvent is selected from the group consisting of aliphatic compounds, aromatic compounds, cycloaliphatic compounds, aliphatic-substituted aromatic compounds, cycloaliphatic-substituted aromatic compounds, aliphatic-substituted cycloaliphatic compounds and mixtures thereof.

3. The process of claim 1 wherein said first organic solvent is selected from the group consisting of naphthalene, anthracene, ethyl benzene, cyclohexyl benzene, cyclopropane, cyclobutane, cyclopentane, cyclopentene, 1,3-cyclopentadiene, cyclohexane, cyclohexene 1,3-cyclohexadiene, methylcyclopentane, methylcyclohexane, 1,3-dimethylcyclohexane, 3-ethylcyclopentene, 3,5-dimethylcyclopentene and combinations therof.

4. The process of claim 1 wherein said first organic solvent is selected from the group consisting of propane, cyclopropane, propylene, n-butane, isobutane, cyclobutane, butene, butene-1, cis-butene-2, trans-butene-2, butadine, 1,3-butadiene, isobutylene, n-pentane, isopentane, neopentane, cyclopentane, pentene, pentene-1, cis-pentene-2, cyclopentene, pentadiene, 1,3-pentadiene, cyclopentadiene, cyclohexane, cyclohexene, cyclohexadiene, methylene chloride, dichlorodifluoromethane, trichlorofuloro-methane, cloroethane, trichloroethane, dichlorotetrafluoroethane, trichlorothylene, tetrafluoroethylene, chloropropane, chlorobutane, chloropentane, dichloropentane, benzene, toluene, xylene, naptha, kerosene, gas oil, gasoline reformate, rafinate and combinations thereof.

5. The process of claim 1 wherein the said dehydration additive is calcium oxide.

6. The process of claim 1 wherein the feed composition additionally contains cyanide compounds and said dehydration additive comprises at least one alkaline earth metal oxide.

7. The process of claim 6 wherein said dehydration additive is calcium oxide.

8. The process of claim 1 wherein the first organic solvent is kerosene.

9. The process of claim 1 with the step of separating at least part of said water from said feed composition prior to step (a).

10. The process of claim 1 wherein said first organic solvent is combined with said dehydration additive prior to contacting said feed composition in step (a).

11. The process of claim 1 including vaporizing at least a part of said water during step (a).

12. The process of claim 1 wherein the separation of step (b) produces a first solution of at least part of said first organic solvent containing extractable organic material and an intermediate composition comprising at least a part of the remaining said extractable organic material, solids and hydrated additive.

13. The process of claim 12, said process further comprising:

(c) contacting said intermediate composition with a second organic solvent capable of extracting at least a portion of said extractable organic material; and (d) separating at least part of said organic solvent containing extractable organic material from said intermediate composition to form a second solution of said second organic solvent and a final composition comprising solid and hydrated additive.

14. The process of claim 13 wherein the feed composition additionally contains cyanide compounds and said dehydration additive is an alkaline earth metal oxide.

15. The process of claim 14 wherein said final composition additionally comprises at least a part of said cyanide compound.

16. The process of claim 15 wherein said final composition is heated to a temperature sufficient to decompose the cyanide compounds.

17. The process of claim 12 wherein the feed composition additionally contains cyanide compounds and said dehydration additive is an alkaline earth metal oxide.

18. The process of claim 17 wherein said intermediate composition additionally comprises at least a portion of said cyanide compound.

19. The process of claim 18 wherein said intermediate composition is heated to a temperature sufficient to decompose the cyanide compounds.

20. The process of claim 1 wherein said organic material comprises hydrocarbon oil, and said feed composition comprises 1% to about 25% by weight hydrocarbon oil, from about 45% to 80% by weight water, and from about 1% to about 60% by weight solids.

21. The process of claim 20 wherein said dehydration additive comprises at least one alkaline earth metal oxide, and said solvent is selected from the group consisting of aromatic hydrocarbons, aliphatic hydrocarbons, cycloaliphatic hydrocarbons, kerosene, gasoline reformate and combinations thereof.

22. The process of claim 21 wherein said dehydration additive is calcium oxide and said solvent is kerosene.

* * * * *